Oct. 30, 1928.
E. B. NICHOLS
DRIVE CHAIN
Filed Aug. 20, 1926
1,689,556
FIG. 1.
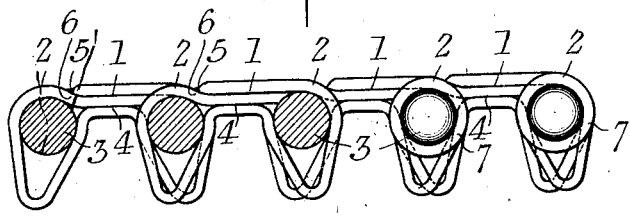
FIG. 3.
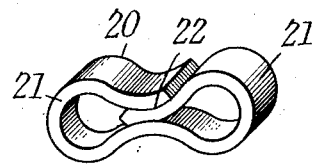
FIG. 2.
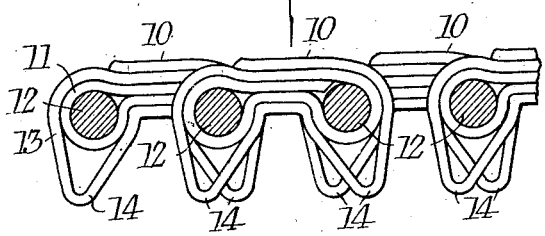
FIG. 5.
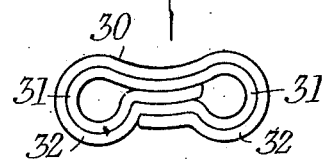
FIG. 4.
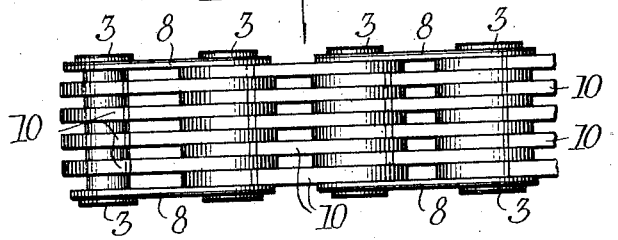
FIG. 6.
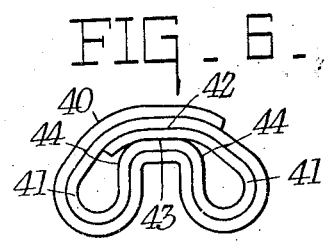
FIG. 7.
FIG. 8.
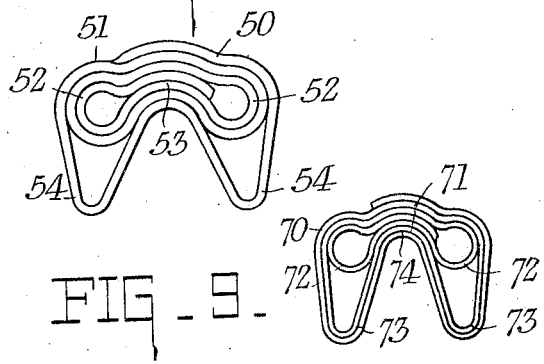
FIG. 9.
Inventor,
Edgar B Nichols Patented Oct. 30, 1928.

1,689,556

UNITED STATES PATENT OFFICE.

EDGAR B. NICHOLS, OF ROCHESTER, NEW YORK.

DRIVE CHAIN.

Application filed August 20, 1926. Serial No. 130,530.

This invention relates to chains and particularly to drive chains. One object of my invention is to provide a cheap link formed from strip material. Another object is to provide a link which is accurate in dimension and which can be made strong for its weight. Another object is to provide a reinforcing layer of metal at the weakest part of the link. Another object is to provide a drive chain link built up from a plurality of metal layers. Still another object is to provide a link which, if desired, may be provided with a certain amount of resiliency to care for the shock of suddenly applied power, and other objects will appear hereinafter, the novel features being particularly pointed out in the claims at the end of the specification.

In drive chains, such as sprocket chains, link belt chains, etc., the high cost has always been a drawback to their more general use. To be suitable for most purposes extreme accuracy in the pin openings is required and it has been common practice to punch out these links and then drill and sometimes ream the pinholes in the links thus formed. This has necessarily been an expensive operation and the cost of chains employing such links is high.

In certain classes of work there has been provided links having a certain amount of resiliency,—that is, links capable of permitting variations between the pin openings under a sudden applied force, the link resiliency permitting the pin apertures to return to a normal spacing under the normal steady force applied during normal operation. To secure such resiliency the pin openings of the links have been slotted in various ways to reduce cross sectional areas at given points.

My new strip metal link is designed to overcome the disadvantages of the punched up link, and is adaptable to form rigid or resilient links as required, by metal strip construction, adding additional layers of metal when additional strength is required.

Coming now to the drawings wherein like reference characters denote like parts throughout:

Fig. 1 is a side elevation of a section of a drive chain having links constructed in accordance with and embodying one form of my invention, parts being shown in section;

Fig. 2 is a perspective view of another embodiment of my invention;

Fig. 3 is a perspective view of a link member constructed in accordance with another embodiment of my invention;

Fig. 4 is a top plan view of chain section shown in Fig. 2; and

Figs. 5, 6, 7, 8 and 9 are typical formed up links made in accordance with and illustrating my invention.

Referring to Fig. 1, the drive chain may be composed of a plurality of links 1, each consisting of a strip of metal, here shown as rectangular in cross section, formed into a pair of pin loops 2 through which pins 3 pass. Between the pin loops 2 are a series of layers 4 of strip metal and I prefer to weld one end 5 of the strip to the next strip 6. It should be here noted that in this form of link there is a greater cross sectional area of metal midway between the links, giving strength where it is most necessary. In this embodiment there is a pin bearing which does not contact with the pin through its entire periphery.

A chain may be built up of as many of these links as desired, and the pins 3 may be headed over on washers 7 or the familiar type of side plates 8 may be used, as shown in Fig. 4.

In Figs. 2 and 4 a stronger chain is shown as being built up of a plurality of folds of metal of dissimilar shape, one fold reinforcing the other. Here the links members 10 include pin loops 11, each adapted to engage the pins 12, the second fold 13 lying in the same plane as the first fold and being shaped into teeth 14. Side plates 8 may be used to connect the link elements with the pins 12 into a power chain.

Fig. 3 illustrates the simplest form of link element made in accordance with my invention. A flat band of metal 20 is bent into pin loops 21 of similar shape, there being three thicknesses of metal at 22 between the pin loops. Welding may be used for uniting two or more of these layers if desired.

Fig. 5 is for a link element similar to that shown in Fig. 3, but built for greater strength. A metal strip 30 is bent into pin loops 31 and about the link thus formed another convolution of metal 32 is formed to reinforce the first metal layer. This type of link illustrates a relatively rigid link.

If a certain amount of resiliency is required, the link elements shown in Figs. 6, 7, 8 and 9 may be built up to permit such resiliency where required.

For instance, in Fig. 6 the element consists of a metal strip 40 bent into pin loops 41, that portion 42 intermediate the pin loops being arched, preferably above the normal axis of the pin loops. The central portion 43 of the link consists of a plurality of metal layers, and the angularly disposed portions 44 tend to spring apart under a sudden force, returning to their normal position under a normal load.

In Fig. 7 I show a link element 51 made up from the metal strip 50 wound so that the pin loops 52 and connecting member 53 is of greater rigidity than the teeth 54. These teeth, being of a single metal layer, may give or spring from their normal position when force is suddenly applied. Such a chain is useful for machine starting chains.

Fig. 8 shows a simple link element 61 made from band stock 60 having single layer combined pin loops 62 and teeth 63, there being a multi-ply connecting member 64. This type of link is more resilient than that shown in Fig. 3.

In Fig. 9 the link element 70 is made from a plurality of laminations of relatively thin metal 71 shaped into pin loops 72, an arched connection 74 and teeth 73.

Obviously, from the examples above described, my invention may be embodied into a number of forms, and I, therefore, contemplate as within the scope of my invention all such forms as may come within the scope of the appended claims.

Having thus described my invention, what I claim as new and desire to secure by Letters Patent is:

1. A link for drive chains comprising a plurality of metal layers, one layer including pin loops, and another layer including gear engaging teeth.

2. A link for drive chains comprising a plurality of metal layers, one layer including pin loops, another layer including gear engaging teeth, the second layer having areas in contact with and reinforcing the first layer.

3. A link for drive chains comprising a plurality of metal layers, one layer including pin loops, and another layer in contact with the first layer throughout the greater part of its length, and spaced from the first layer adjacent the pin loops to form gear engaging teeth.

4. A link for drive chains comprising a plurality of metal layers of strip material including pin loops of substantially cylindrical shape formed in one layer of metal, and a second layer of metal coiled about the first layer, gear engaging teeth being included in the second layer of metal, said gear engaging teeth having portions engaging portions of the pin loops.

5. A link for drive chains comprising a plurality of metal layers, one layer including pin loops, another layer including gear engaging teeth, the layers of metal between the pin loops and gear engaging teeth lying in contact.

Signed at Rochester, N. Y., this 18th day of August, 1926.

EDGAR B. NICHOLS.